US009760803B2

United States Patent
Kulick et al.

(10) Patent No.: US 9,760,803 B2
(45) Date of Patent: Sep. 12, 2017

(54) ASSOCIATING CLASSIFICATIONS WITH IMAGES

(71) Applicant: Google Inc., Mountain View, CA (US)

(72) Inventors: Matthew Kulick, San Francisco, CA (US); Hartwig Adam, Marina del Rey, CA (US); Taehee Lee, Los Angeles, CA (US); Brian Potetz, Irvine, CA (US)

(73) Assignee: Google Inc., Mountain View, CA (US)

( * ) Notice: Subject to any disclaimer, the term of this patent is extended or adjusted under 35 U.S.C. 154(b) by 810 days.

(21) Appl. No.: 14/075,424

(22) Filed: Nov. 8, 2013

(65) Prior Publication Data
US 2014/0341476 A1 Nov. 20, 2014

Related U.S. Application Data

(60) Provisional application No. 61/823,538, filed on May 15, 2013.

(51) Int. Cl.
G06K 9/62 (2006.01)
G06F 17/30 (2006.01)

(52) U.S. Cl.
CPC ....... *G06K 9/6267* (2013.01); *G06F 17/3028* (2013.01); *G06F 17/30247* (2013.01)

(58) Field of Classification Search
CPC ......... G06F 17/30247; G06F 17/30277; G06F 17/3005; G06F 17/30528; G06F 17/3053;
(Continued)

(56) References Cited

U.S. PATENT DOCUMENTS 8,254,647 B1 * 8/2012 Nechyba ............ G06K 9/00248
382/118
8,468,111 B1 6/2013 Tgavalekos et al.
(Continued)

FOREIGN PATENT DOCUMENTS

WO WO2011060565 * 5/2011

OTHER PUBLICATIONS

Notification of Transmittal of the International Search Report and the Written Opinion of the International Searching Authority, or the Declaration corresponding to PCT/US2014/038025, mailed on Sep. 3, 2014, 16 pages.
(Continued)

*Primary Examiner* — Stephen R Koziol
*Assistant Examiner* — Shaghayegh Azima
(74) *Attorney, Agent, or Firm* — IP Spring

(57) ABSTRACT

One or more devices may receive multiple images; determine one or more classifications for each of the multiple images; generate a confidence score for each classification of the one or more classifications for each of the multiple images. The confidence score may include a value between two numbers and may identify the likelihood that that a particular classification, of the one or more classifications, correctly corresponds to a particular image, of the multiple images. The confidence score may be based on information, associated with a user, and pixel-based classification information. The one or more devices may sort the multiple images by the one or more classifications and by corresponding confidence scores to form sorted multiple images; and provide the sorted multiple images.

20 Claims, 11 Drawing Sheets

(58) Field of Classification Search
CPC . G06F 17/30389; G06K 9/623; G06K 9/6267
See application file for complete search history.

(56) References Cited

U.S. PATENT DOCUMENTS

| | | | |
|---|---|---|---|
| 2010/0008547 A1* | 1/2010 | Yagnik | G06F 17/30781 |
| | | | 382/118 |
| 2010/0124378 A1* | 5/2010 | Das | G06F 17/30247 |
| | | | 382/225 |
| 2010/0211575 A1* | 8/2010 | Collins | G06F 17/30044 |
| | | | 707/749 |
| 2011/0099199 A1 | 4/2011 | Stalenhoef et al. | |
| 2011/0128288 A1* | 6/2011 | Petrou | G06F 17/30047 |
| | | | 345/428 |
| 2011/0137895 A1* | 6/2011 | Petrou | G06F 17/30241 |
| | | | 707/723 |
| 2012/0076367 A1* | 3/2012 | Tseng | G06K 9/00288 |
| | | | 382/118 |
| 2012/0213404 A1 | 8/2012 | Steiner | |
| 2012/0328163 A1 | 12/2012 | Panzer et al. | |
| 2014/0140625 A1* | 5/2014 | Zhang | G06K 9/00677 |
| | | | 382/195 |
| 2015/0169575 A1* | 6/2015 | Adam | G06F 17/30265 |
| | | | 707/728 |

OTHER PUBLICATIONS

PCT International Preliminary Report on Patentability mailed in PCT Application No. PCT/US2014/038025, Nov. 26, 2015, 12 pages.
Gallagher, "Image annotation using personal calendars as context", Proceeding of the 16th ACM International Conference on Multimedia, MM '08, Oct. 26, 2008, pp. 681-684.

* cited by examiner

400 →

| Image 410 | Classification (confidence) 420 |
|---|---|
| Wedding.jpg | Event = Wedding (95%) <br> Event = Party (98%) <br> Object = Cake (90%) <br> Expression = Happy (90%) |
| Party.jpg | Event = Party (99%) <br> Event = Birthday party (90%) |
| Family.jpg | User = Bob (90%) <br> User = James (80%) <br> Event = Reunion (90%) |
| ⋮ | |
| Image Y | |

-Pixel-based classification information:
Object = Cake (90%)
Object = Wedding dress (80%)

-Metadata information:
Timestamp = 10/23/10, 5 PM
Geo-location = Gaithersburg, MD

-User information:
-Schedule information: Wedding event on 10/23/10
-E-mail contents: 10 messages with the term "wedding", "dress" with reference to the date 10/23/10
-Social networking information: 20 posts within a threshold number of days of 10/23/10 with the term "wedding"
-Chats: 15 conversations with the term "wedding" and referring to the date 10/23/10
-Voice calls: 5 conversations with the term "wedding"

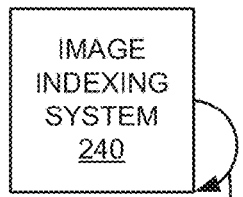

Image classification and scoring

Image classifications:
Event = Wedding (95%)
Event = Party (98%)
Object = Cake (90%)
Object = Wedding dress (95%)

FIG. 5

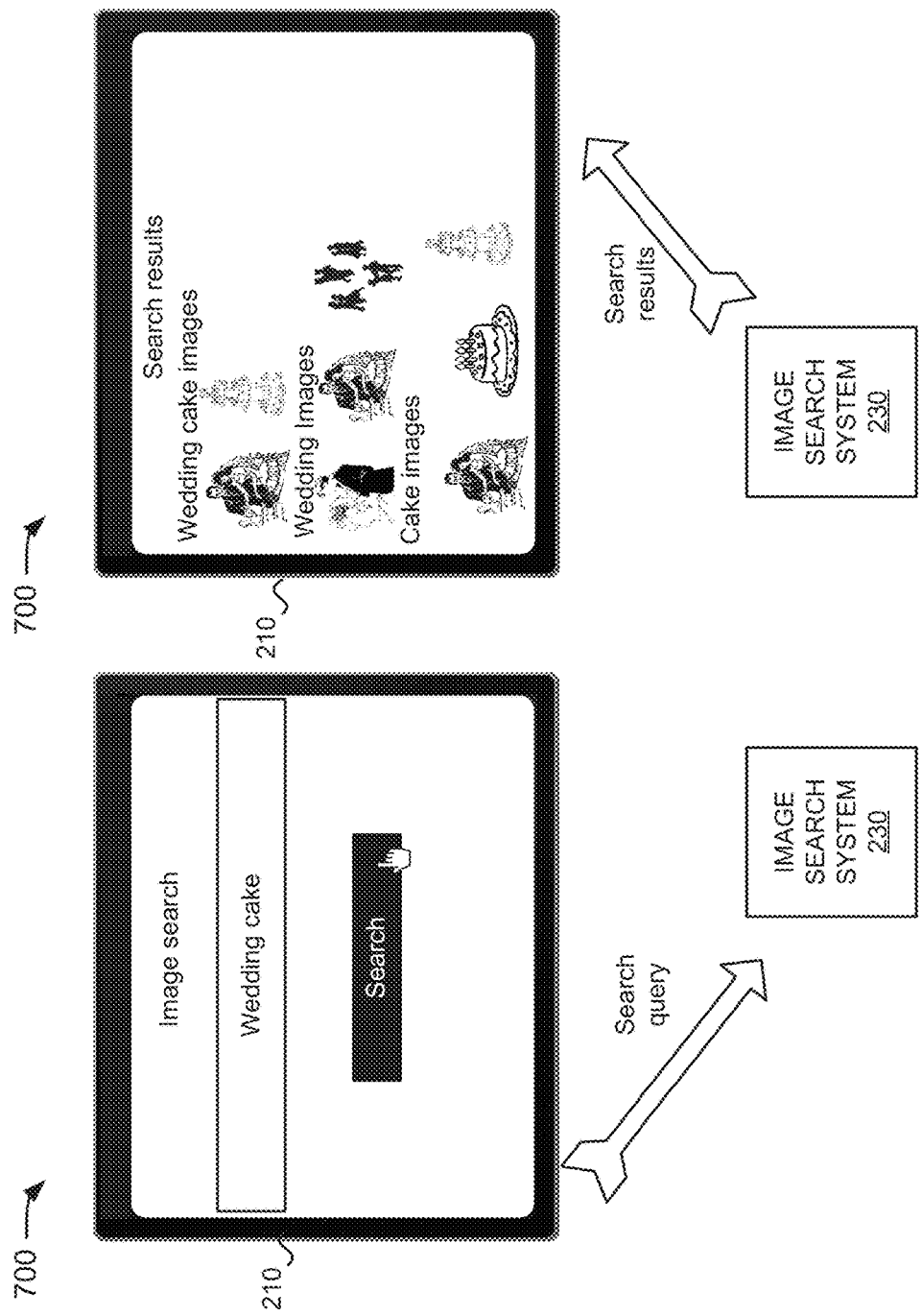

ASSOCIATING CLASSIFICATIONS WITH IMAGES

RELATED APPLICATION

This application claims priority to U.S. Provisional Patent Application No. 61/823,538, filed May 15, 2013, the disclosure of which is incorporated by reference herein.

BACKGROUND

Users sometimes store images digitally, for example, in a digital album or photo library. Organizing the images, (e.g., by creating albums, adding labels to the images, etc.) can be a tedious and time consuming process. Also, searching for images, especially those without labels, can be cumbersome, thereby causing difficulties in allowing the user to find a particular image of interest.

SUMMARY

According to some possible implementations, a method may include receiving, by one or more devices, multiple images; determining, by the one or more devices, one or more classifications for each of the multiple images; generating, by the one or more devices, a confidence score for each classification of the one or more classifications for each of the multiple images. The confidence score may include a value between two numbers and may identify the likelihood that that a particular classification, of the one or more classifications, correctly corresponds to a particular image, of the plurality of images. The confidence score may be based on information, associated with a user, and pixel-based classification information. The method may further include sorting, by the one or more devices, the multiple images by the one or more classifications and by corresponding confidence scores to form a sorted plurality of images; and providing, by the one or more devices, the sorted plurality of images.

According to some possible implementations, the method may further include receiving a search query; identifying images, of the multiple images, based on the one or more classifications and the search query; generating a ranking score for each of the images based on the confidence scores for the images; and generating a ranked list of the images. The images may be sorted in the ranked list based on the ranking scores. The method may further include providing the ranked list, where providing the sorted multiple images includes providing the ranked list.

According to some possible implementations, the ranking score may further be based on a relevant score, and/or a quality score value. The relevancy score be based on the search query. The quality score may be based on a size, a resolution or a measure of popularity of the images.

According to some possible implementations, determining the one or more classifications may be based on information associated with a user. The information may include at least one of: an e-mail account associated with the user, a calendar associated with the user, a web chat associated with the user, a voice call associated with the user, a web browsing history profile associated with the user, or a social networking profile associated with the user.

According to some possible implementations, determining the one or more classifications may be based on an object in a particular image, of the multiple images, that identifies a particular event and based on event-related user information that identifies the particular event.

According to some possible implementations, determining the one or more classifications may be based on metadata that identifies a particular time and based on event-related user information that identifies an event occurring at the particular time.

According to some possible implementations, determining the one or more classifications may be based on metadata that identifies a particular time, based on user information that identifies a particular event occurring at the particular time, and based on an object in a particular image, of the multiple images, that identify the particular event.

According to some possible implementations, each classification of the one more classifications may be indicative of an event, an object, a time of day, an activity, a geographic location, a person, or a facial expression associated with a particular image of the multiple images.

According to some possible implementations, one or more devices may store a data structure. The data structure may associate multiple images with one or more classifications for each image of the multiple images. The data structure may associate a confidence score for each classification of the one or more classifications for each image of the multiple images. The confidence score may be based on information, associated with a user, and pixel-based classification information. The data structure may sort the multiple images by the one or more classifications and by corresponding confidence scores to form sorted multiple images.

According to some possible implementations, the one or more devices may receive a search query; identify images, of the multiple images, based on the one or more classifications, stored in the data structure, and the search query; generate a ranking score for each image of the images based on the confidence scores for the images; and generate a ranked list of the images. The images may be sorted in the ranked list based on the ranking scores. The one or more devices may provide the ranked list to a user device to cause the user device to display the ranked list.

According to some possible implementations, the one or more classifications may be based on information associated with a user. The information may include at least one of: an e-mail account associated with the user, a calendar associated with the user, a web chat associated with the user, a voice call associated with the user, a web browsing history profile associated with the user, or a social networking profile associated with the user.

According to some possible implementations, the one or more classifications may be based on an object in a particular image, of the multiple images, that identifies a particular event and based on event-related user information that identifies the particular event.

According to some possible implementations, the one or more classifications may be based on metadata that identifies a particular time and based on event-related user information that identifies an event occurring at the particular time.

According to some possible implementations, the one or more classifications may be based on metadata that identifies a particular time, based on event-related user information that identifies a particular event occurring at the particular time, and based on an object in a particular image, of the plurality of images, that identify the particular event.

According to some possible implementations, each classification of the one more classifications may be indicative of an event, an object, a time of day, an activity, a geographic location, a person, or a facial expression associated with a particular image of the multiple images.

According to some possible implementations, a computer-readable medium may store instructions. The instructions may include one or more instructions that, when executed by one or more processors of a device, cause the one or more processors to store a data structure. The data structure may associate multiple images with one or more classifications for each image of the multiple images. The data structure may associate a confidence score for each classification of the one or more classifications for each image of the multiple images. The data structure may associate a confidence score for each classification of the one or more classifications for each image of the multiple images. The confidence score may include a value between two numbers and may identify the likelihood that a particular classification, of the one or more classifications, correctly corresponds to a particular image, of the multiple images. The confidence score may be based on information, associated with a user, and pixel-based classification information.

According to some possible implementations, the multiple instructions may further cause the one or more processors to receive a search query; identify images, of the multiple images, based on the one or more classifications, stored in the data structure, and the search query; generate a ranking score for each image of the images based on the confidence scores for the images; and generate a ranked list of the images. The images may be sorted in the ranked list based on the ranking scores. The multiple instructions may further cause the one or more processors to provide the ranked list to a user device to cause the user device to display the ranked list.

According to some possible implementations, the one or more classifications may be based on information associated with a user. The information may include at least one of: an e-mail account associated with the user, a calendar associated with the user, a web chat associated with the user, a voice call associated with the user, a web browsing history profile associated with the user, or a social networking profile associated with the user.

According to some possible implementations, the one or more classifications may be based on an object in a particular image, of the multiple images, that identifies a particular event and based on event-related user information that identifies the particular event.

According to some possible implementations, the one or more classifications may be based on metadata that identifies a particular time and based on event-related user information that identifies an event occurring at the particular time, or based on an object in a particular image, of the plurality of images, that identify the particular event.

According to some possible implementations, a system may include means for receiving multiple images; means for determining one or more classifications for each of the multiple images; and means for generating a confidence score for each classification of the one or more classifications for each of the multiple images. The confidence score may include a value between two numbers and may identify the likelihood that that a particular classification, of the one or more classifications, correctly corresponds to a particular image, of the multiple images. The confidence score may be based on information, associated with a user, and pixel-based classification information. The system may include means for sorting the plurality of images by the one or more classifications and by corresponding confidence scores to form a sorted plurality of images; and means for providing the sorted plurality of images.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 4 illustrates an example data structure that may be stored by one or more devices in the environment of FIG. 2;

FIG. 5 illustrates an example of the process described in connection with FIG. 3;

FIGS. 7A-7D illustrate an example of the process described in connection with FIG. 6.

DETAILED DESCRIPTION

The following detailed description refers to the accompanying drawings. The same reference numbers in different drawings may identify the same or similar elements.

Systems and/or methods, as described herein, may associate a particular classification with an image based on pixel-based classification information (e.g., objects, colors, patterns, and/or some other content in the image), metadata information, and/or user information. In some implementations, a predetermined list of classifications may be used to associate the particular classification with the image. In some implementations, a classification, associated with the image, may identify one or more attributes of the contents of an image, such as an event, an object, a geographic location, a person/user, a group of people/users, a facial expression, an activity, a gesture, a time of day, a timeframe, and/or some other attribute associated with the contents of the image.

In some implementations, a user may identify an image, associated with a particular classification, even when the image has not been manually labeled by the user. Also, because a classification may be associated with all image based on a combination of pixel-based classification information, metadata information, and/or user information, the image may be more accurately classified than when the image is classified solely based on pixel-based classification information.

Figure 1A:
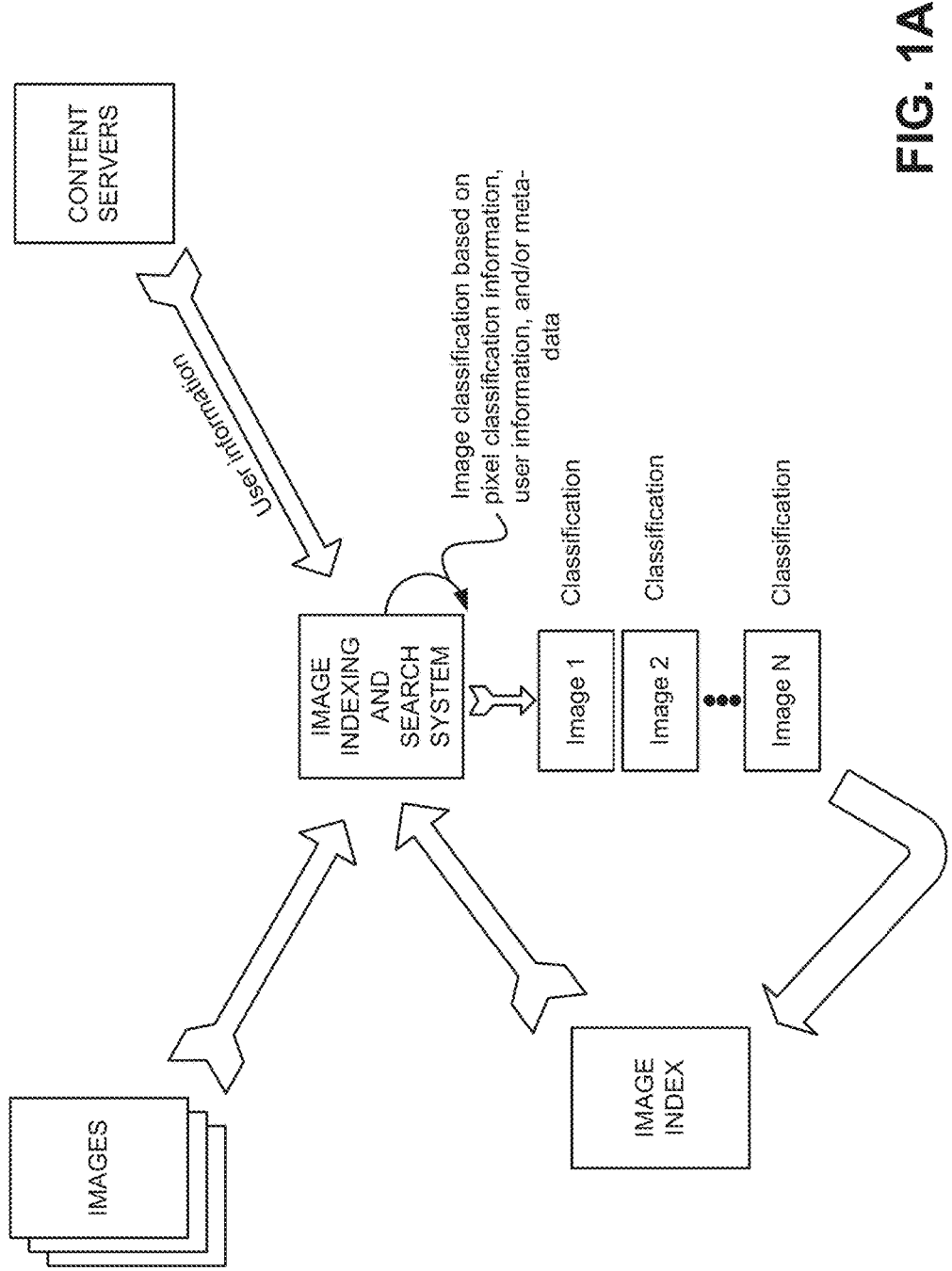
FIGS. 1A-1C illustrate an example overview of some implementations described herein.
Figure 1B:
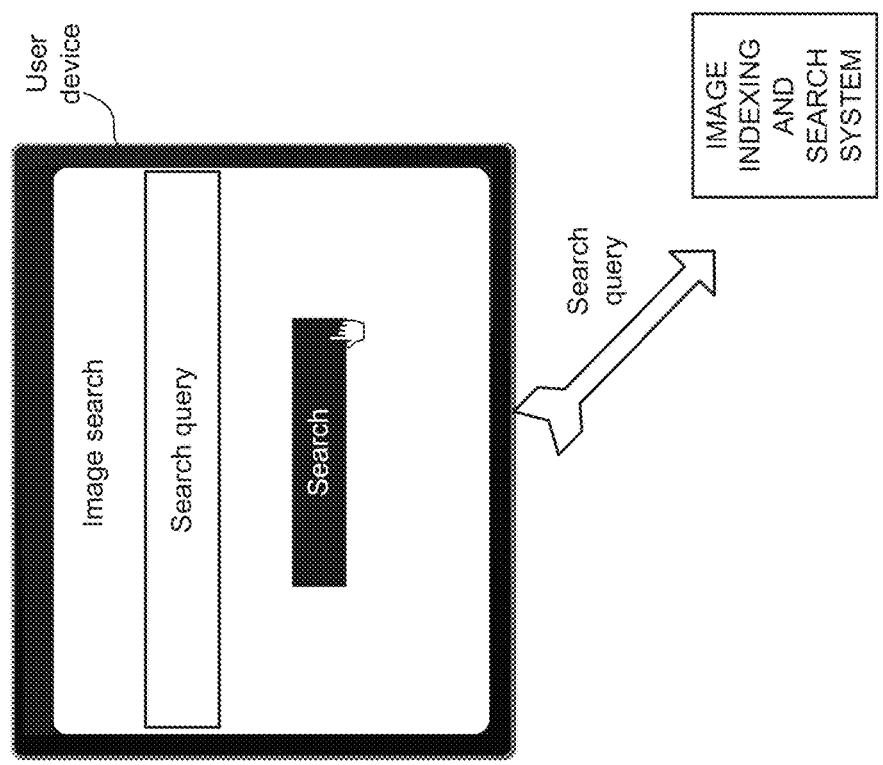
Figure 1C:
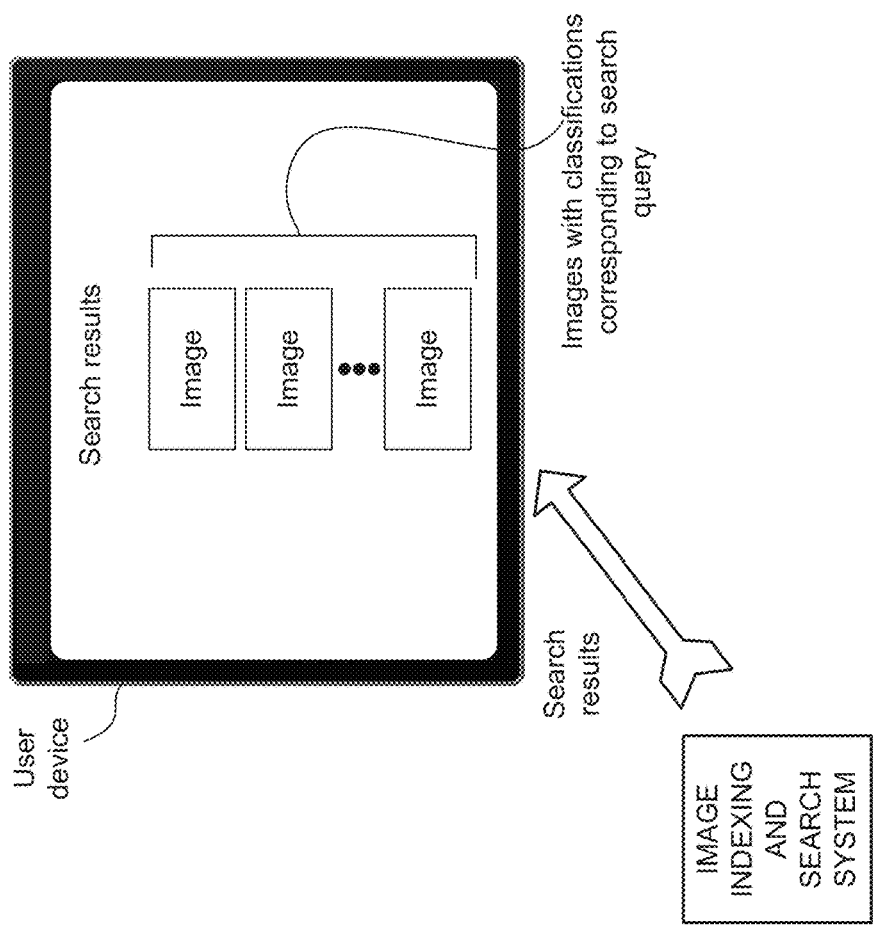

FIGS. 1A-1C illustrate an example overview of some implementations described herein. As shown FIG. 1A, an image indexing and search system may receive and store multiple images (e.g., images captured and/or provided by a user device). In some implementations, the image indexing and search system may receive information regarding a user, associated with the images, from one or more content servers. For example, the user information may be obtained from the user's e-mail account, calendar, web chats, voice calls, profiles (e.g., web browsing history profile, social networking profile, etc.), and/or from some other source.

For the described systems and methods, the user can control whether the programs or features collect user personal information (e.g., information about a user's social network, actions, activities, a user's preferences, or a user's current location), or the extent such information is collected or used. In addition, certain data may be treated in one or more ways before the data is stored or used, so that personally identifiable information is removed, encrypted, and/or otherwise protected for the user. Thus, the user may have control over how information about the user is collected and used by a server.

As shown in FIG. 1A, the image indexing and search system may associate a classification with the images, for example, based on pixel-based classification information, user information, and/or metadata, associated with the images. In some implementations, the image indexing and search system may associate a classification with the image in the form of a textual label. As an example, the image indexing and search system may associate the classification "event wedding" with a particular image to identify that the particular image is associated with a wedding event, (e.g., as determined by correlating a timestamp of the particular image with a wedding event identified in the user's calendar, and/or with the presence of an object in the image that corresponds to a wedding event, such as a wedding cake, a bridal gown, a tuxedo, etc.).

In some implementations, the image indexing and search system may associate a classification with an image in some other format in addition to or alternatively to a textual label. For example, the image indexing and search system may associate a classification in the form of an entity identifier associated with a knowledge database or a collection of structured data.

In some implementations, the image indexing and search system may generate a confidence score that identifies the likelihood that that the classification correctly corresponds to the particular image. In FIG. 1A, assume that the image indexing and search system associates a particular classification with images 1 through N (where N≥1). As further shown in FIG. 1A, the image indexing and search system may form an image index that stores a list of the images with information that identifies classifications associated with the images.

Referring to FIG. 1B, the image indexing and search system may receive a search query from a user device. Referring to FIG. 1C, the image indexing and search system may identify particular images that are associated with a classification corresponding to the search query, and may provide the particular images (e.g., in order of confidence score) to the user device. For example, images having the classification "event=birthday," may be provided in response to a search query including the term "birthday."

As a result, the user may identify an image, associated with a particular classification (e.g., a particular event, object, geographic location, person, etc.), even when the image has not been manually labeled by the user. Also, the image may be more accurately classified than when the image is classified solely using pixel-based classification information. For example, a classification of "event=birthday" may be associated with an image when the image includes a timestamp that corresponds to a user's schedule information that identifies a birthday event during the time included in the timestamp. Thus, the image may be associated with the classification "event=birthday" when pixel-based classification information alone does not associate the classification "event=birthday" with the image (e.g., when the image does not include an object or other content corresponding to a birthday event). In some implementations, a classification, such as "event=my birthday" or the classification "event=user's birthday" may be associated with an image when the user information identifies that the user's birthday took place at the same time that the image was captured.

Figure 2:
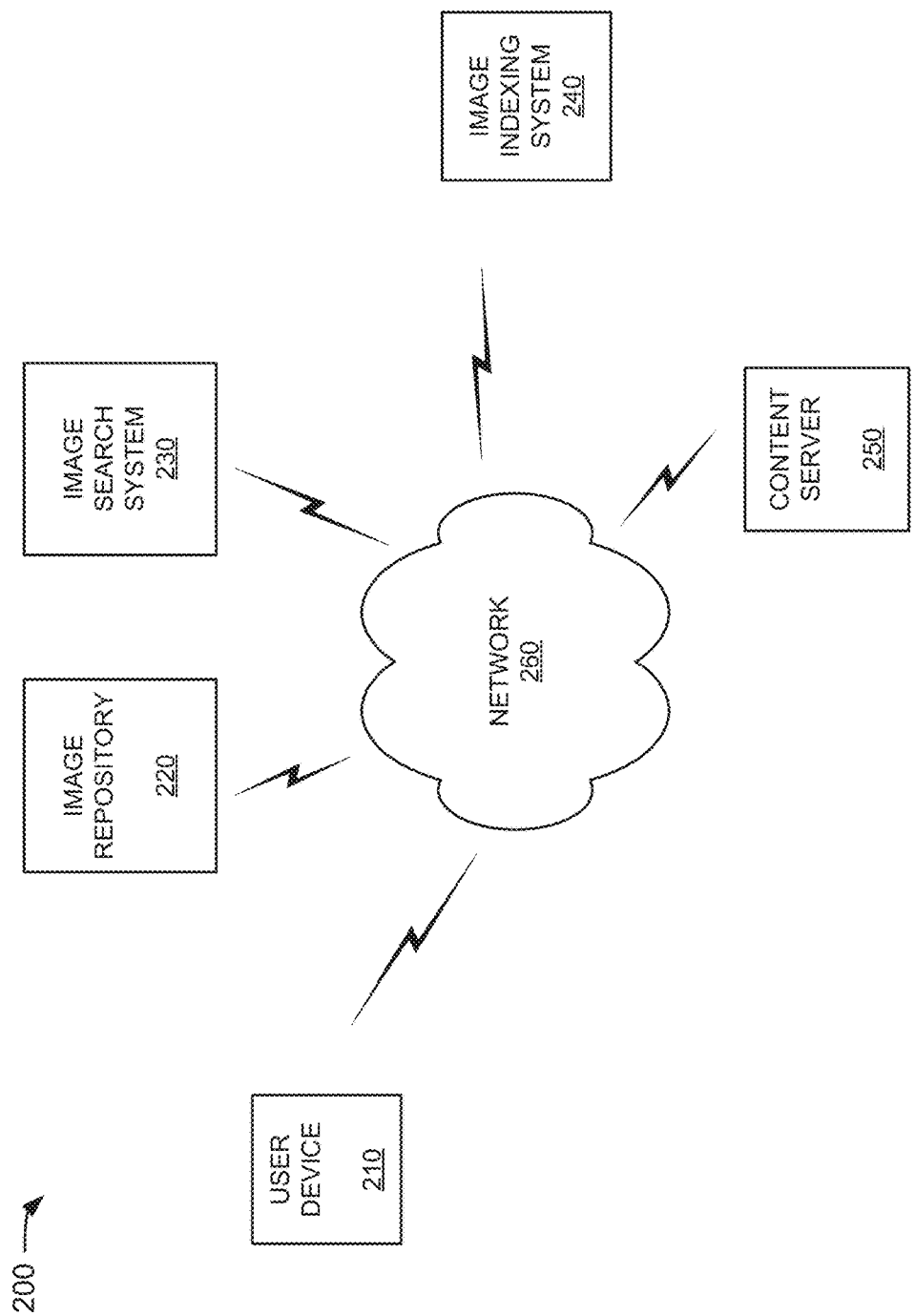
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, image repository 220, image search system 230, image indexing system 240, content server 250, and/or network 260.

User device 210 may include a device capable of communicating via a network, such as network 210. For example, user device 210 may correspond to a mobile communication device (e.g., a smart phone or a personal digital assistant (PDA)), a portable computer device (e.g., a laptop or a tablet computer), a desktop computer, a gaming device, a camera device, and/or some other device. In some implementations, user device 210 may provide an image to image repository 220. In some implementations, user device 210 may provide a search query to image search system 230 and may receive a list of images, having a classification corresponding to the search query, based on providing the search query.

Image repository 220 may include one or more computing devices, such as a server device or a collection of server devices. In some implementations, image repository 220 may store one or more images received from a user via user device 210. In some implementations, an image may include information identifying the user that provided the image (e.g., based on login credentials/profile information identifying the user and used by the user when providing the image to image repository 220 via user device 210). In some implementations, image repository 220 may provide an image based on receiving a request for the image.

Image search system 230 may include one or more computing devices, such as a server device or a collection of server devices. In some implementations, image search system 230 may receive a search query from user device 210 and may identify one or more images, stored by image repository 220, that are associated with a classification corresponding to the search query. In some implementations, image search system 230 may generate a ranked list of the one or more images and provide a response to the search query in the form of a list of images and/or a list of links to the images presented in order of ranking.

Image indexing system 240 may include one or more computing devices, such as a server device or a collection of server devices. In some implementations, image indexing system 240 may store a list of images, stored by image repository 220, with links to the images. In some implementations, image indexing system 240 may access an image, identify pixel-based classification information of the image (e.g., objects, shapes, colors, patterns, etc. in the image), identify metadata information, associated with the image (e.g., user information, date/time information, geographic location information, etc.), and/or identify user information (e.g., based on information stored by content server 250). In some implementations, image indexing system 240 may associate a classification with the image based on the pixel-based classification information, the metadata information, and/or the user information.

Content server 250 may include one or more computing devices, such as a server device or a collection of server devices. In some implementations, content server 250 may store user information and may provide the user information to image indexing system 240. For example, content server 250 may store data extracted from a user's e-mail messages, social media information (e.g., profiles, posts, messages, images, event information, etc.), chat history, voice call transcriptions, calendar/schedule information, and/or other information associated with the user that may be used to classify an image. The user may have control over how information about the user is collected and used by content server 250. For example, content server 250 may extract data from a user's e-mail messages, social media information, chat history, voice call transcriptions, calendar/schedule information, etc. based on receiving an authorization from the user to extract the data.

Network 260 may include one or more wired and/or wireless networks. For example, network 260 may include a cellular network, a public land mobile network (PLAN), a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. In some implementations, multiple devices of environment 200 may be integrated into a single device. Devices of environment 200 may interconnect via wired connections, wireless connections, or a combination of wired and wireless connections.

Figure 3:
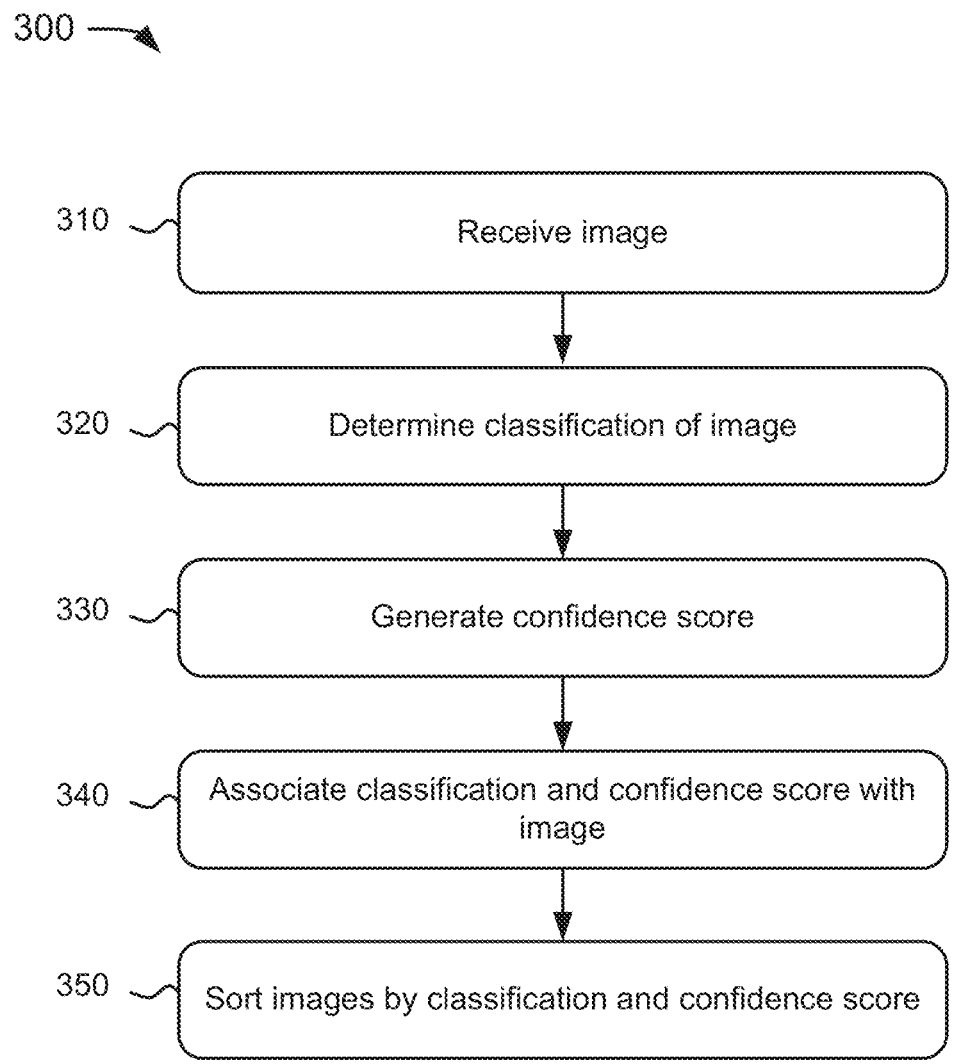
FIG. 3 illustrates a flowchart of an example process for associating a classification and a confidence score with an image.

FIG. 3 illustrates a flowchart of an example process 300 for associating a classification and a confidence score with an image. In some implementations, process 300 may be performed by one or more components of image indexing system 240. In some implementations, some or all of the blocks of process 300 may be performed by one or more components of another device in environment 200 (e.g., user device 210, image repository 220, image search system 230, and/or content server 250), or a group of devices including or excluding image indexing system 240.

As shown in FIG. 3, process 300 may include receiving an image (block 310). For example, image indexing system 240 may receive an image from image repository 220 when image repository 220 receives the image from user device 210 (e.g., when user device 210 captures the image and provides the image to image repository 220 for storage). As described above, the image may be associated with information identifying the user when the user provides the image to image repository 220 via user device 210.

Process 300 may also include determining a classification of the image (block 320). For example, image indexing system 240 may determine a classification of the image based on data inputs, such as metadata information, pixel-based classification information, user information, and/or other information. In some implementations, the pixel-based classification information may include information identifying objects, text, colors, patterns, logos, facial expressions, facial features, particular users, particular gestures, notions, activities, and/or some other attribute associated with an image. In some implementations, the metadata information may include a timestamp, geographic location information, an image label, an image file name, an image size, etc. In some implementations, the user info anon may include the contents of the user's e-mail or text, messages, social media information (e.g., profiles, posts, messages, images, event information, friends/family associated with the laser, etc.), chat history, voice call transcriptions, calendar/schedule information, and/or some other information associated with the user.

As an example, assume that the image includes a timestamp, such as 10/23/10, 1 PM Further, assume that the user information includes information identifying a family reunion event on 10/23/10 (e.g., based on a user's calendar and/or based on conversations in an e-mail message, social media message, text message, chats, etc.). Further, assume that the pixel-based classification information for the image includes information that identifies the user. For example, the pixel-based classification information may identify the user based on facial recognition of the user in the image. Further, based on the user's social media information (e.g., information identifying the user's family members and images of the user's family members), the pixel-based classification information may identify the user's family members based on facial recognition of the user's family members in the image. Given the above assumptions, image indexing system 240 may associate a classification with the image, such as the classification "event=family reunion."

As described above, image indexing system 240 may associate multiple classifications with the image. Continuing with the above example, assume that the image includes objects associated with a party event (e.g., balloons, a cake, etc.). Given this assumption, image indexing system 240 may associate the classification "event=party" with the image (e.g., based on pixel-based classification information that identifies the objects and based on a classification associated with the objects). Further, assume that the image includes users participating in a particular activity, such as dancing. Given this assumption, image indexing system 240 may associate the classification "activity=dancing" with the image (e.g., based on pixel-based classification information that identifies gestures relating to the activity of dancing.

Process 300 may further include generating a confidence score (block 330). For example, image indexing system 240 may generate a confidence score for each classification associated with the image. In some implementations, image indexing system 240 may determine the confidence score based on one or more values assigned to the classification. The values may be based on data inputs that image indexing system 240 used to identify the classification. In some implementations, the confidence score may identify the likelihood that that the classification correctly corresponds to the image. For example, the value may be on a scale, such as a scale from 0-100, where 0 indicates a 0% likelihood that the classification corresponds to the image and where 100 indicates a 100% likelihood that the classification corresponds to the image. Alternatively, the value may be on some other scale.

Continuing with the above example, image indexing system 240 may generate a classification score for the "family reunion" classification by assigning one or more values to the classification based on data inputs that image indexing system 240 used to associate the classification "event=family reunion" with the image. For example, given data inputs, such as a timestamp of the image and a calendar event, corresponding to the timestamp, on the user's calendar entitled "family reunion," image indexing system 240 may assign a value to the classification "event=family reunion."

In the above example, the value may be based on an indication that the user attended a family reunion event (e.g., when the user's calendar, e-mail conversations, chat conversations, social networking conversations, etc. indicate that the user attended the family reunion event). In some implementations, the value may be higher based on the indication that the user attended the family reunion event in comparison to when the indication is absent.

Continuing with the above example, the value for the classification "event=family reunion" may be higher than the value for another classification, such as "event=family meeting," since the schedule information of the user entitled "family reunion" includes terms that indicate that the image is more likely to correspond to the classification "event=family reunion" than to the classification "event=family meeting."

Given other data inputs, such as pixel-based classification information (e.g., facial recognition) that identifies family members of the user, image indexing system 240 may assign another value to the classification "event=family reunion." As described in greater detail below with respect to FIG. 5, a pixel-based classification data input may include a value that identifies the likelihood that an object, pattern, color, facial expression, gesture, etc., is correctly identified.

Based on the values, image indexing system 240 may determine a confidence score (e.g., by combining the values, applying weights to the values, etc.). For example, image indexing system 240 may apply a weight to the value corresponding to the timestamp and user calendar data inputs and another weight to the value corresponding to the pixel-based classification data input. In some implementations, the confidence score may be proportional to the values associated with the data inputs.

Process 300 may also include associating the classification and confidence score with the image (block 340). For example, image indexing system 240 may store (e.g., in a data structure) information that maps the classification(s) and confidence score(s) to the image. Continuing with the above example, image indexing system 240 may store information that maps the image to the classifications "event=family reunion," "event=party," and "activity=dancing." Further, image indexing system 240 may store information that maps the classification scores to each classification of the image. Some examples of associating a classification and a confidence score with an image are described below with respect to FIG. 4.

Process 300 may also include sorting images by classification and confidence score (block 350). For example, image indexing system 240 may sort multiple images by classifications and confidence scores associated with each image (e.g., when image indexing system 240 associates classifications and confidence scores with the multiple images in accordance with blocks 310-340). In some implementations, indexing system 240 may generate a document that includes the sorted images. For example, the document may group images, associated with a particular classification, in an album, a folder, an index, etc. for display on user device 210. In some implementations, user device 210 may receive the document and present the document to the user. In some implementations, the document may include thumbnails or previews of the images with links to the images. Additionally, or alternatively, document may present the images as full-size images (e.g., images in the original size and resolution as stored by image repository 220). Additionally, or alternatively, the document may present the images in some other manner.

While FIG. 3 shows process 300 as including a particular quantity and arrangement of blocks, in some implementations, process 300 may include fewer blocks, additional blocks, or a different arrangement of blocks. Additionally, or alternatively, some of the blocks may be performed in parallel.

While process 300 is described in terms of determining classifications and confidence scores for an image, in practice, process 300 may apply to multiple images. For example, image indexing system 240 may determine classifications and confidence scores for multiple images at a particular time (e.g., batch processing) or may determine classifications and confidence scores for individual images as received in real-time from image repository 220 (via user device 210). The particular examples of classifications, described in FIG. 3, are for explanatory purposes only. In practice, other examples are possible from what is shown in FIG. 3.

FIG. 4 illustrates an example data structure 400 that may be stored by one or more devices in environment 200, such as image search system 230 and/or image indexing system 240. In some implementations, data structure 400 may be stored in a memory of image search system 230 and/or image indexing system 240. In some implementations, data structure 400 may be stored in a memory separate from, but accessible by, image search system 230 and/or image indexing system 240. In some implementations, data structure 400 may be stored by some other device in environment 200, such as user device 210, image repository 220, and/or content server 250.

A particular instance of data structure 400 may contain different information and/or fields than another instance of data structure 400. In some implementations, data structure 400 may store information that associates an image with a classification having a confidence score.

As shown in FIG. 4, data structure may include a collection of fields, such as an image field 410 and a classification field 420.

Image field 410 may store information identifying an image. In some implementations, image field 410 may store a link to the image. In some implementations, image field 410 may store the actual image.

Classification field 420 may store info oration identifying one or more classifications associated with a corresponding image of image field 410. In some implementations, classification field 420 store information identifying a confidence score of each classification associated with a corresponding image. In some implementations, the confidence score may be expressed as a percentage and/or in expressed in some other format. For example, the confidence score may include a value in between two numbers.

In an example shown in FIG. 4, assume that image repository 220 stores an image having the file name "wedding.jpg." Further, assume that image indexing system 240 associates multiple classifications with the image and corresponding confidence scores for each classification (e.g., in accordance with process 300). For example, assume that image indexing system 240 associated the classifications "event=wedding," "event=party," "object=cake", and "expression=happy" with the image. Further, assume that image indexing system 240 generates confidence scores of 95%, 98%, 90%, and 90%, respectively, for each of the classifications. Given these assumptions, data structure 400 may store the file name "wedding.jpg" and, in a column corresponding to the file name, data structure 400 may store "event=wedding (95%)," "event=party (98%)," "object=cake (90%)", and "expression=happy (90%)."

In some implementations, data structure 400 may store overlapping classifications for an image. For example, the classification "event=party" may overlap with the classification "event=birthday party," In some implementations, the classification "event=party" may include a higher confidence score than the classification "event=birthday party" since the image is more likely to depict a party in general than to depict a particular type of party, such as a birthday party. As another example, the classification "event=our wedding" may overlap with the classification "event=wedding." In some implementations, the classification "event=our wedding" may include a lower confidence score than the classification "event=wedding" since the image is more likely to depict a wedding in general than to depict a wedding of the user.

In some implementations, a classification may be structured and may be linked with other classifications. That is, multiple classifications may be associated with common image attributes. For example, the classification "event=wedding" may be linked to the classifications "event=wedding reception," "event=wedding ceremony," "person=bride," "person=groom," etc.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

FIG. 5 illustrates an example 500 of the process described in connection with FIG. 3. In example 500, assume that image indexing system 240 receives an image and performs an image classification and scoring function in relation to the image (e.g., in accordance with process 300). For example, image indexing system 240 may identify data inputs, associated with the image, such as pixel-based classification information, metadata information, and user information. In example 500, the pixel-based classification information may identify objects in the image, such as a cake and a wedding dress. As shown in FIG. 5, the pixel-based classification information may include values that identify the likelihood that the objects are correctly identified. In some implementations, the values may be used to generate a confidence score for a classification of the image.

As further shown in FIG. 5, image indexing system 240 may identify metadata, associated with the image. In the example of FIG. 5, the metadata may include a timestamp (e.g., 10/23/10, 5 PM) and information identifying a geographic location (e.g., Gaithersburg, Md.).

As further shown in FIG. 5, image indexing system 240 may identify user information that corresponds to the metadata. For example, image indexing system 240 may communicate with content server 250 to identify the user information, such as schedule information of the user, e-mail contents for e-mails associated with the user, social networking information associated with the user, chat conversations associated with the user, transcriptions of voice calls associated with the user, etc. In example 500, the schedule information may identify a wedding event corresponding to the timestamp. In some implementations, the schedule information may be derived from the user's calendar, the user's e-mail, chat, and/or social networking conversations, and/or derived from some other source.

Continuing with example 500, the user information may identify a particular quantity of e-mail messages with reference to the date in the timestamp (10/23/10) and having the terms "wedding" and "dress." Further, the user information may identify a quantity of social networking posts within a threshold number of days from 10/23/10 and having the term "wedding." Also, the user information may identify a quantity of chat conversations and/or voice call transcripts having the term "wedding" and referring to the date 10/23/10.

Given the above data inputs (pixel-based classification information, metadata information, and user information), image indexing system 240 may associate classifications with the image and may generate confidence scores for each classification (e.g., in accordance with process 300). Continuing with example 500, image indexing system 240 may associate the classifications "event=wedding," "event=party," "object=cake," and "object=wedding dress" to the image. Also, image indexing system 240 may generate respective confidence scores for each classification, such as 95%, 98%, 90%, and 95%.

While a particular example is shown in FIG. 5, it will be apparent that the above description is merely an example implementation. Other examples are possible from what is shown in FIG. 5.

Figure 6:
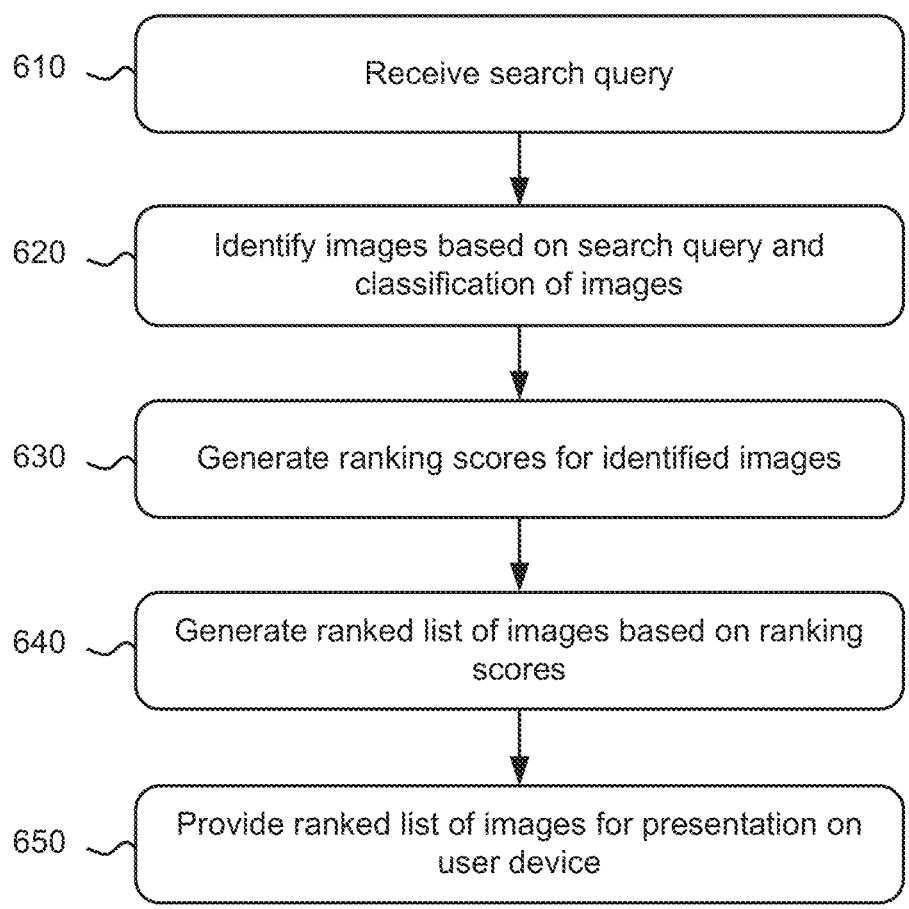
FIG. 6 illustrates a flowchart of an example process for identifying images associated with a classification corresponding to a search query and providing a list of the images to a user.

FIG. 6 illustrates a flowchart of an example process 600 for identifying images associated with a classification corresponding to a search query and providing a list of the images to a user. In some implementations, process 600 may be performed by one or more components of image search system 230. In some implementations, some or all of the blocks of process 600 may be performed by one or more components of another device in environment 200 (e.g., user device 210, image repository 220, image indexing system 240, and/or content server 250), or a group of devices including or excluding image search system 230.

As shown in FIG. 6, process 600 may include receiving a search query (block 610). For example, image search system 230 may receive a search query from user device 210 (e.g., based on a command, from a user of user device 210, to perform a search using the search query). In some implementations, the search query may include one or more terms and a request to receive images with classifications corresponding to the one or more terms. Additionally, or alternatively, the search query may include an image file with a request to receive images with classifications similar to that of the image in the search query.

Process 600 may also include identifying images based on the search query and classification of images (block 620). For example, image search system 230 may identify images whose classification corresponds to terms in the search query. In some implementations, image search system 230 may identify the images based on information stored by data structure 400. For example, image search system 230 may access data structure 400 and identify images whose classification corresponds to the terms in the search query. As an example, assume that the search query includes the terms "family" and "gathering." Given this assumption, image search system 230 may identify images whose classification corresponds to the terms "family" and "gathering" For example, image search system 230 may identify images with the classifications "group=family," "event=gathering," "event=party," "event=reunion," "event=family reunion," and/or some other classification that may relate to the search terms. In some implementations (e.g., when the search query includes an image), image search system 230 may identify a classification of the image e.g., based on pixel-based information of the image) and may identify images, in image repository 220, whose classification corresponds to the classification of the image in the search query. In some implementations, image search system 230 may identify images whose confidence scores, corresponding to the likelihood that the images are correctly classified, satisfies a particular threshold (e.g., a 50% threshold, a 60% threshold, or some other threshold).

Process 600 may further include generating ranking scores for the identified images (block 630). For example, image search system 230 may generate ranking scores for each of the identified images. In some implementations, the ranking score for an image may be based on the confidence score of the classification associated with the image, a relevancy score, a quality score, and/or some other type of score.

In some implementations, the relevancy score may include a measurement of relevancy of an image with respect to the search query. For example, for the search query including the terms "family" and "gathering," the relevancy score for an image having the classification "event=family reunion" may be higher than relevancy score for an image having the classification "event=party" (e.g., since the classification "event=family reunion" matches the search terms more closely than the classification "event=party"). In some implementations, the quality score may include a measurement of image quality (e.g., based on image size, resolution, noise, contrast, color, distortion, exposure, lens flare, etc.). In some implementations, the quality score may include a measure of popularity, such as a number of times the image has been viewed, shared, saved, etc. In some implementations, the confidence score, the relevancy score, the quality score, and/or another score may be combined to generate the ranking score for an image.

Process 600 may also include generating a ranked list of images based on the ranking scores (block 640). For example, image search system 230 may generate a list including the identified images associated with a classification corresponding to the search query. In some implementations, image search system 230 may sort the list in ascending order based on the ranking scores. In some implementations, the list of images may include links to a location where the images are stored (e.g., links to image repository 220).

Process 600 may further include providing the ranked list of images for presentation on the user device (block 650). For example, image search system 230 may generate a document that includes some or all of the ranked list of images and provide the document to user device 210. User device 210 may receive the document and present the document to the user. In some implementations, the document may include thumbnails or previews of the images with links to the images. Additionally, or alternatively, document may present the images as full-size images (e.g., images in the original size and resolution as stored by image repository 220). In some implementations, the document may present the classification of the images. In some implementations, the document may present images whose confidence score satisfy a particular threshold. In some implementations, the document may present the images in a user interface, such as a web album, a photo application, a content search application, and/or some other type of user interface. Additionally, or alternatively, the document may present the images in some other manner.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figures 7C, 7D:
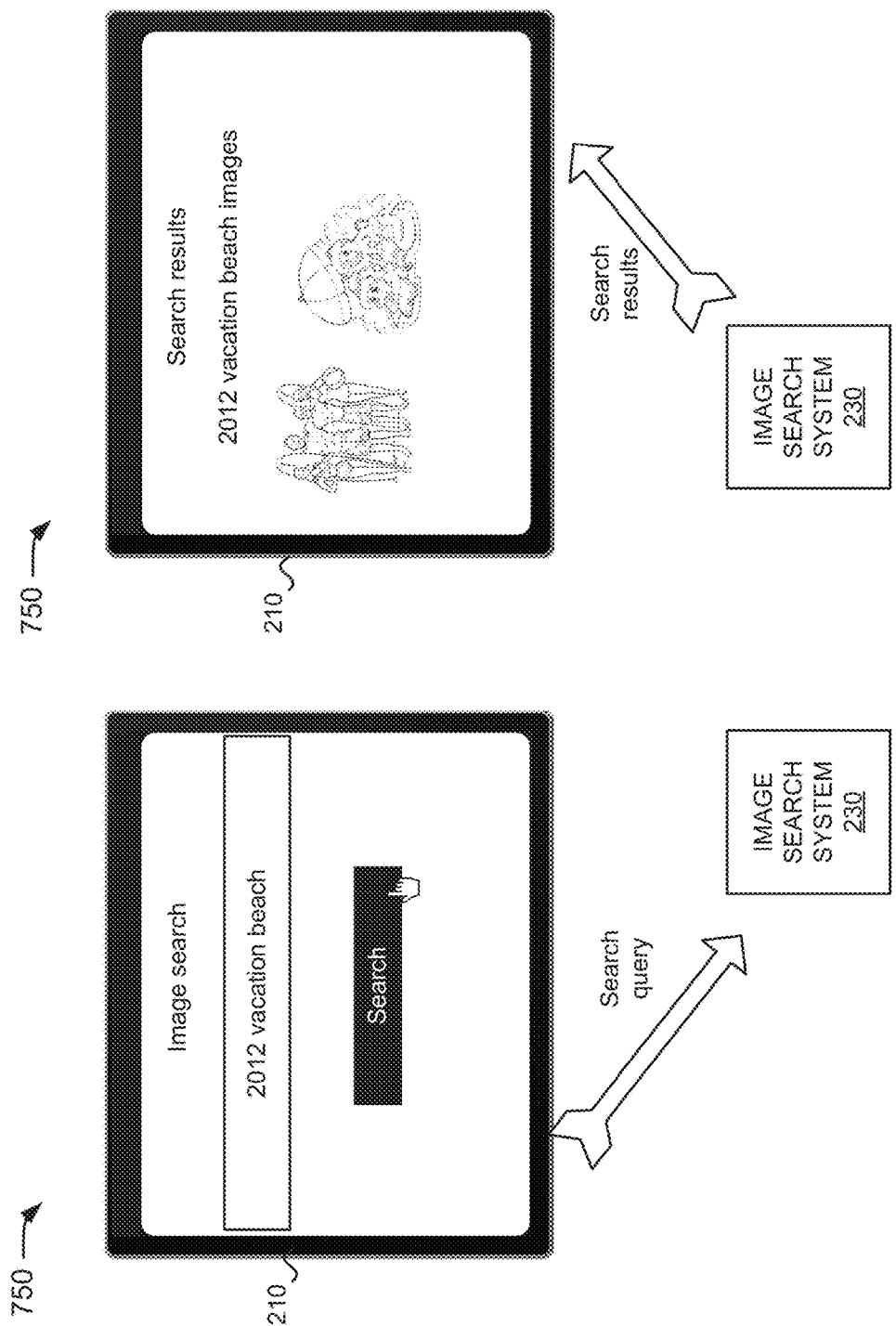

FIGS. 7A-7D illustrate examples 700 and 750 of the process described above with respect to FIG. 6. In example 700 (FIG. 7A), user device 210 may provide, to image search system 230, a search query (e.g., a request to receive images associated with classifications corresponding to the terms "wedding" and "cake"). In some implementations, and in accordance with process 600, image search system 230 may receive the search query, identify images, stored by image repository 220 (e.g., based on information stored by data structure 400), associated with classifications corresponding to the terms in the search query, generate ranking scores for the identified images, generate a ranked list of the identified images, and provide the ranked list to user device 210 for presentation on user device 210. As shown in FIG. 7B, user device 210 may receive the ranked list of the identified images and display multiple lists of images with each list of images corresponding to a particular classification. For example, user device 210 may display a list of images associated with the classification "object wedding cake," a list of images associated with the classification "event=wedding," and a list of images associated with the classification "object=cake." As shown in FIG. 7B, the same image may be associated with multiple classifications.

In some implementations, image indexing system 240 may associate a classification with a group of images based on a time-span of the images. For example, images that were taken over a particular amount of time (e.g., a one-week time-span) may be associated with a classification that is associated with the one-week time-span (e.g., a vacation event). Images that were taken over another time span (e.g., a 3-hour time-span) may be associated with a classification that is associated with the 3-hour time-span (e.g., a party event, a sports event, etc.).

Referring now to example 750 (FIG. 7C), assume that image indexing system 240 associates the classification "event=vacation" to a group of images (e.g., based on a time-span of timestamps associated with the image and based on other data inputs that support this classification). In accordance with process 600, image search system 230 may provide a list of images (e.g., beach vacation images from the year 2012) when user device 210 provides a search query including the terms "2012," "vacation," and "beach." For example, referring to FIG. 7D, user device 210 may receive the list of images.

While particular examples are shown in FIGS. 7A-7D, it will be apparent that the above descriptions are merely example implementations. Other examples are possible from what is shown in FIGS. 7A-7D.

Figure 8:
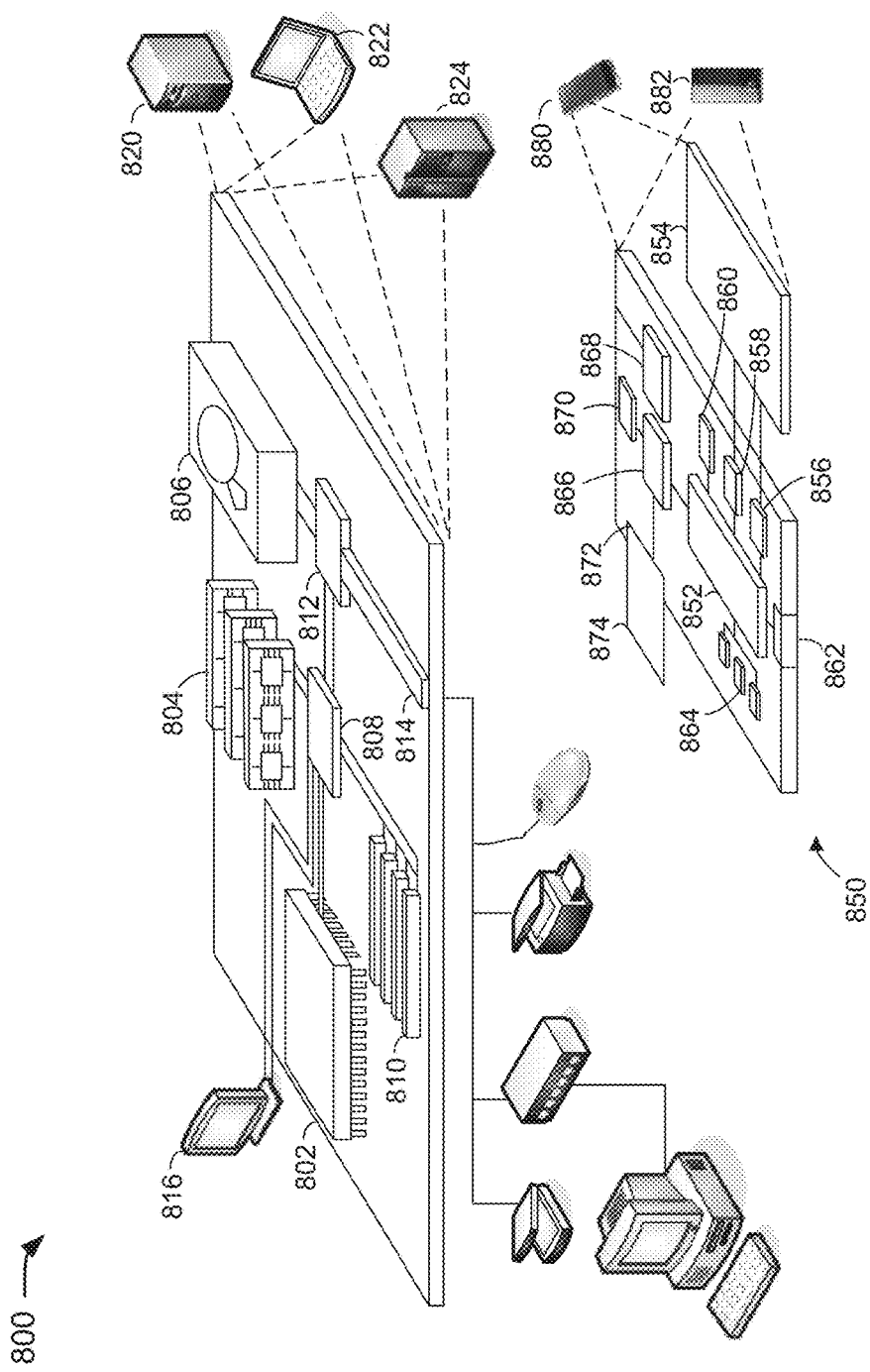
FIG. 8 illustrates an example of a generic computing device and a generic mobile computing device, which may be used with the techniques described herein.

FIG. 8 is a diagram of an example of a generic computing device 800 and a generic mobile computing device 850, which may be used with the techniques described herein. Generic computing device 800 or generic mobile computing device 850 may correspond to, for example, a user device 210, image repository 220, image search system 230, image indexing system 240, and/or content server 250. Computing device 800 is intended to represent various forms of digital computers, such as laptops, desktops, workstations, personal digital assistants, servers, blade servers, mainframes, and other appropriate computers. Mobile computing device 850 is intended to represent various forms of mobile devices, such as personal digital assistants, cellular telephones, smart phones, and other similar computing devices. The components shown in FIG. 8, their connections and relationships, and their functions, are meant to be examples only, and are not meant to limit implementations described herein.

Computing device 800 may include a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. Processor 802 can process instructions for execution within the computing device 800, including instructions stored in the memory 804 or on the storage device 806 to display graphical information for a graphical user interface (GUI) on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations, as a server bank, a group of blade servers, or a multi-processor system, etc.

Memory 804 stores information within the computing device 800. In some implementations, memory 804 includes a volatile memory unit or units. In some implementations, memory 804 includes a non-volatile memory unit or units. The memory 804 may also be another form of computer-readable medium, such as a magnetic or optical disk, computer-readable medium may refer to a non-transitory memory device. A memory device may refer to storage space within a single storage device or spread across multiple storage devices.

The storage device 806 is capable of providing mass storage for the computing device 800. In some implementations, storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 804, storage device 806, or memory on processor 802.

High speed controller 808 manages bandwidth-intensive operations for the computing device 800, while tow speed controller 812 manages lower bandwidth-intensive operations. Such allocation of functions is exemplary only. In one implementation, high-speed controller 808 is coupled to memory 804, display 816 (e.g., through a graphics processor or accelerator), and to high-speed expansion ports 810, which may accept various expansion cards (not shown). In this implementation, low-speed controller 812 is coupled to storage device 806 and low-speed expansion port 814. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 800 may be implemented in a number of different firms, as shown in the figure. For example, computing device 800 may be implemented as a standard server 820, or multiple times in a group of such servers. Computing device 800 may also be implemented as part of a rack server system 824. In addition, computing device 800 may be implemented in a personal computer, such as a laptop computer 822. Alternatively, components from computing device 800 may be combined with other components in a mobile device (not shown), such as mobile computing device 850. Each of such devices may contain one or more of computing devices 800, 850, and an entire system may be made up of multiple computing devices 800, 850 communicating with each other.

Mobile computing device 850 may include a processor 852, memory 864, an input/output ("I/O") device, such as a display 854, a communication interface 866, and a transceiver 868, among other components. Mobile computing device 850 may also be provided with a storage device, such as a micro-drive or other device, to provide additional storage. Each of the components 850, 852, 864, 854, 866, and 868 are interconnected using various buses, and several of the components may be mounted on a on motherboard or in other manners as appropriate.

Processor 852 can execute instructions within mobile computing device 850, including instructions stored in memory 864. Processor 852 may be implemented as a chipset of chips that include separate and multiple analog and digital processors. Processor 852 may provide, for example, for coordination of the other components of mobile computing device 850, such as control of user interfaces, applications run by mobile computing device 850, and wireless communication by mobile computing device 850.

Processor 852 may communicate with a user through control interface 858 and display interface 856 coupled to a display 854. Display 854 may be, for example, a TFT LCD (Thin-film-Transistor Liquid Crystal Display) or an OLED (Organic Light Emitting Diode) display, or other appropriate display technology. Display interface 856 may comprise appropriate circuitry for driving display 854 to present graphical and other information to a user. Control interface 858 may receive commands from a user and convert them for submission to the processor 852. In addition, an external interface 862 may be provide in communication with processor 852, so as to enable near area communication of mobile computing device 850 with other devices, External interface 862 may provide, for example, for wired communication in some implementations, or for wireless communication in other implementations, and multiple interfaces may also be used.

Memory 864 stores information within mobile computing device 850. Memory 864 can be implemented as one or more of a computer-readable medium or media, a volatile memory unit or units, or a non-volatile memory unit or units. Expansion memory 874 may also be provided and connected to mobile computing device 850 through expansion interface 872, which may include, for example, a SIMM (Single In Line Memory Component) card interface. Such Expansion memory 874 may provide extra storage space for device 850, or may also store applications or other information for mobile computing device 850. Specifically, Expansion memory 874 may include instructions to carry out or supplement the processes described above, and may include secure information also. Thus, for example, Expansion memory 874 may be provide as a security component for mobile computing device 850, and may be programmed with instructions that permit secure use of device 850. In addition, secure applications may be provided via the SIMM cards, along with additional information, such as placing identifying information on the SIMM card in a non-hackable manner.

Expansion memory 874 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 864, Expansion memory 874, or memory on processor 852, that may be received, for example, over transceiver 868 or external interface 862.

Mobile computing device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver component 870 may provide additional navigation- and location-related wireless data to mobile computing device 850, which may be used as appropriate by applications running on mobile computing device 850.

Mobile computing device 850 may also communicate audibly using audio codec 860, which may receive spoken information from a user and convert it to usable digital information. Audio codec 860 may likewise generate audible sound for a user, such as through a speaker, e.g., in a handset of mobile computing device 850. Such sound may include sound from voice telephone calls, may include recorded sound (e.g., voice messages, music files, etc.) and may also include sound generated by applications operating on mobile computing device 850.

Mobile computing device 850 may be implemented in a number of different forms, as shown in the figure. For example, mobile computing device 850 may be implemented as a cellular telephone 880. Mobile computing device 850 may also be implemented as part of a smart phone 882, personal digital assistant, a watch 884, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well, for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet As described above, a user may identify an image, associated with a particular classification (e.g., a particular event, object, geographic location, person, activity, facial expression, time period, etc.), even when the image has not been manually labeled by the user. Also, the image may be more accurately classified than when the image is classified alone using pixel-based classification information. For example, a classification of "event=birthday" may be associated with an image when the image includes a timestamp that corresponds to a user's schedule information that identifies a birthday event during the time included in the timestamp. Thus, the image may be associated with the classification "event=birthday" when pixel-based classification information alone does not associate the classification "event=birthday" with the image (e.g., when the image does not include an object corresponding to a birthday event).

In some implementations, a user may group multiple images (e.g., in an album). In some implementations, (e.g., when the user groups multiple images), image indexing system 240 may associate a classification with an image in the group and a confidence score with the classification based on attributes of other images in the group. For example, assume that an album includes a first image (e.g., an image of an object such as a cake) and a second image (e.g., an image of users engaging in an activity such as children playing). Given this assumption, image indexing system 240 may associate a classification, such as "event=birthday" with the first and second images. Further, the confidence score of the classification may be higher than when the confidence score is determined solely on attributes of the first image or when the confidence score is determined solely on attributes of the second image.

As another example, assume that an album includes images 1-11 and that metadata for images 1-11 identify a particular geographic location. In some implementations, a classification of image 11 may be based on pixel-based classification information and/or metadata information associated with images 1-10. For example, assume that the contents of images 1-10 include objects (e.g., balloons) that are associated with a particular event (e.g., a party). Further, assume that the image 11 does not include an object that is associated with a party event. Given these assumptions, the particular geographic location may be associated with a party event such that image 1 may be classified as a party event. Also, future images having metadata that identifies the particular geographic location may be classified as a party event (e.g., since the geographic location is associated with images having objects that correspond to a party event).

As described above, a classification may be based on schedule information associated with the user. Additionally, or alternatively, the classification may be based on user interest information, current events, user profile information, etc. For example, based on profile information, index imaging system 240 may identify all event associated with the user (e.g., a birthday event, a concert/sports event as identified by a ticket purchased by the user, etc.). Also, based on user interest information (e.g., web browsing history, shopping profile, etc.), image indexing system 240 may associate a classification with an image when an image includes an object that pixel-based classification may not identify accurately. For example, assume that pixel-based classification identifies an object, such as a golf ball, in an image. Further, assume that the image includes a ping pong ball rather than a golf ball. Further, assume that the user interest information identifies that the user is interested in ping pong (e.g., based on the user's shopping profile, user profile, browsing profile, etc.). Given these assumptions, image indexing system 240 may associate a classification, such as "object=ping pong ball" when pixel-based classification alone may have identified the object as a golf ball. As a result, an image may be classified more accurately when classified based on a combination of user information, metadata, and/or pixel-based classification than when the image is classified solely using pixel-based classification information.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by one or more devices, a plurality of images;
   determining, by the one or more devices, one or more classifications for each of the plurality of images wherein the one or more classifications are structured and linked with at least one other classification, wherein the one or more classifications for each image of the plurality of images are based on data inputs including one or more of pixel-based information determined based on pixels of the image, metadata information determined based on metadata associated with the image, and user information of a user associated with the image;
   generating, by the one or more devices, a confidence score for each classification of the one or more classifications for each of the plurality of images, the confidence score identifying a likelihood that a particular classification, of the one or more classifications, correctly corresponds to a particular image, of the plurality of images, the confidence score being based on the data inputs, wherein each data input is assigned a respective weight and wherein the confidence score is generated by combining weighted data values;
   sorting, by the one or more devices, the plurality of images by the one or more classifications and by corresponding confidence scores to form a sorted plurality of images; and
   providing, by the one or more devices, the sorted plurality of images.

2. The method of claim 1, further comprising:
   receiving a search query;
   identifying images, of the plurality of images, based on the one or more classifications and the search query;
   generating a ranking score for each of the identified images based on the confidence scores for the images; and
   generating a ranked list of the identified images, the identified images being sorted in the ranked list based on the ranking scores,
   wherein providing the sorted plurality of images includes providing the ranked list.

3. The method of claim 2, where the ranking score is further based on at least one of a relevancy score and a quality score value,
   the relevancy score being based on the search query,
   the quality score value being based on a size, a resolution, or a measure of popularity of the images.

4. The method of claim 1, where determining the one or more classifications is based on an object in respective image, of the plurality of images, that identifies a particular event and based on event-related user information that identifies the particular event.

5. The method of claim 1, is based on wherein the metadata identifies a particular time and the user information identifies an event occurring at the particular time.

6. The method of claim 1, wherein the metadata identifies a particular time, the user information identifies a particular event occurring at the particular time, and an object in a respective image, of the plurality of images, that identifies the particular event.

7. The method of claim 1, where each classification of the one or more classifications is indicative of an event, an object, a time of day, an activity, a geographic location, a person, or a facial expression associated with a particular image of the plurality of images.

8. A system comprising:
a storage device; and
a hardware processor coupled to the storage device, the processor configured to:
store a data structure on the storage device, the data structure associating a plurality of images with one or more classifications for each image of the plurality of images, wherein the one or more classifications are structured and linked with at least one other classification, and wherein the one or more classifications for each image of the plurality of images are based on data inputs that include one or more of pixel-based information determined based on pixels of the image, metadata information determined based on metadata associated with the image, and user information of a user associated with the image, the data structure associating a confidence score for each classification of the one or more classifications for each image of the plurality of images, the confidence score being based on the data inputs, wherein each data input is assigned a respective weight and wherein the confidence score is generated by combining weighted data values, the data structure sorting the plurality of images by the one or more classifications and by corresponding confidence scores to form a sorted plurality of images;
receive a search query;
identify images, of the plurality of images, based on the one or more classifications stored in the data structure on the storage device, and the search query;
generate a ranking score for each image of the identified images based on the confidence scores for the images;
generate a ranked list of the identified images, the identified images being sorted in the ranked list based on the ranking scores; and
provide the ranked list to a user device to cause the user device to display the ranked list.

9. The system of claim 8, wherein the one or more classifications are based on an object in a particular image, of the plurality of images, that identifies a particular event and wherein the user information identifies the particular event.

10. The system of claim 8, the metadata identifies a particular time and the user information identifies an event occurring at the particular time.

11. The system of claim 8, where each classification of the one or more classifications is indicative of an event, an object, a time of day, an activity, a geographic location, a person, or a facial expression associated with a particular image of the plurality of images.

12. A non-transitory computer-readable medium for storing instructions, the instructions comprising:

a plurality of instructions that, when executed by one or more processors associated with a device, causes the one or more processors to:
store a data structure, the data structure associating a plurality of images with one or more classifications-for each image of the plurality of images, wherein the one or more classifications are structured and linked with at least one other classification, and wherein the one or more classifications for each image of the plurality of images are based on data inputs including one or more of pixel-based information determined based on pixels of the image, metadata information determined based on metadata associated with the image, and user information of a user associated with the image, the data structure associating a confidence score for each classification of the one or more classifications for each image of the plurality of images, the confidence score identifying a likelihood that that a particular classification, of the one or more classifications, correctly corresponds to a particular image, of the plurality of images, the confidence score being based on the data inputs, wherein each data input is assigned a respective weight and wherein the confidence score is generated by combining weighted data values;
receive a search query;
identify images, of the plurality of images, based on the one or more classifications stored in the data structure, and the search query;
generate a ranking score for each image of the identified images based on the confidence scores for the images;
generate a ranked list of the identified images, the identified images being sorted in the ranked list based on the ranking scores; and
provide the ranked list to a user device to cause the user device to display the ranked list.

13. The non-transitory computer-readable medium of claim 12, wherein the user information includes at least one of an e-mail account associated with the user, a calendar associated with the user, a web chat associated with the user, a voice call associated with the user, a web browsing history profile associated with the user, or a social networking profile associated with the user.

14. The non-transitory computer-readable medium of claim 12, wherein the one or more classifications are based on an object in a particular image, of the plurality of images, that identifies a particular event and wherein the user information that identifies the particular event.

15. The system of claim 8, wherein the data structure stores overlapping classifications for the image.

16. The non-transitory computer-readable medium of claim 12, wherein the data structure associates a classification in a form of an entity identifier associated with a knowledge base or a collection of structured data.

17. The method of claim 1, wherein at least a first classification and a second classification of the one or more classifications overlap, and wherein a first confidence score for the first classification is higher than a second confidence score for the second classification that is more specific than the first classification.

18. The method of claim 1, further comprising determining a time-span of the plurality of images based at least in part on respective timestamps associated with each of the plurality of images.

19. The method of claim 18, wherein at least one classification of the one or more classifications is based on the time-span.

20. The method of claim 1, wherein at least one image of the plurality of images is assigned a classification based on data inputs associated with one or more other images of the plurality of images.

* * * * *